United States Patent
Aldecoa

(10) Patent No.: US 9,736,668 B2
(45) Date of Patent: *Aug. 15, 2017

(54) DATA ASSISTANCE APPLICATION FOR MOBILE DEVICES

(71) Applicant: 24/7 Customer, Inc., Campbell, CA (US)

(72) Inventor: Kioma Aldecoa, Alameda, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,702

(22) Filed: Oct. 15, 2015

(65) Prior Publication Data

US 2016/0037316 A1 Feb. 4, 2016

Related U.S. Application Data

(63) Continuation of application No. 13/888,598, filed on May 7, 2013, now Pat. No. 9,198,010.

(60) Provisional application No. 61/644,357, filed on May 8, 2012.

(51) Int. Cl.
*H04M 3/42* (2006.01)
*H04W 4/20* (2009.01)
*H04W 4/02* (2009.01)

(52) U.S. Cl.
CPC ............... *H04W 4/20* (2013.01); *H04W 4/02* (2013.01); *H04W 4/203* (2013.01)

(58) Field of Classification Search
CPC ............... H04L 29/08108; H04L 29/06; H04L 41/0213; H04L 29/08072; H04Q 3/005; G06Q 40/00; G06F 17/30864

USPC .......... 455/414.1, 461; 705/35; 707/769, 707/E17.014, E17.049, 742; 709/227, 709/223, 203

See application file for complete search history.

(56) References Cited

U.S. PATENT DOCUMENTS

| | | | |
|---|---|---|---|
| 5,008,853 A | 4/1991 | Bly et al. | |
| 2003/0093533 A1* | 5/2003 | Ezerzer | H04L 41/0893 709/227 |
| 2004/0059776 A1* | 3/2004 | Pitzel | G06F 17/30595 709/203 |
| 2006/0200396 A1* | 9/2006 | Satterfield | G06Q 20/40 705/35 |
| 2007/0243887 A1 | 10/2007 | Bandhole et al. | |
| 2007/0260715 A1 | 11/2007 | Alexandrov et al. | |
| 2011/0149809 A1* | 6/2011 | Narayanaswamy | H04L 12/1818 370/260 |

(Continued)

FOREIGN PATENT DOCUMENTS

| | | |
|---|---|---|
| WO | 02/42879 A2 | 5/2002 |
| WO | 2005/114921 | 12/2005 |

*Primary Examiner* — Charles Appiah
*Assistant Examiner* — Alexander Yi
(74) *Attorney, Agent, or Firm* — Perkins Coie LLP

(57) ABSTRACT

A data assist application allows people to share structured data, and update and/or collaborate in real time. Companies can use embodiments of the invention to send and/or receive structured data. Embodiments of the data assist application work standalone or while a user is talking to a person or a company. In use, information is spread when people share data with non-users. The data are preferably owned and/or controlled by the user and stored on user devices. Further embodiments of the invention integrate with OS-supplied data and third party apps.

24 Claims, 12 Drawing Sheets

(56) References Cited

U.S. PATENT DOCUMENTS

2011/0302194 A1\* 12/2011 Gonzalez .......... G06F 17/30241
  707/769
2012/0084296 A1  4/2012 Waters \* cited by examiner

DATA ASSISTANCE APPLICATION FOR MOBILE DEVICES

CROSS REFERENCE TO RELATED APPLICATIONS

This application is a continuation of U.S. patent application Ser. No. 13/888,598, filed May 7, 2013, which claims priority to U.S. provisional patent application Ser. No. 61/644,357, filed May 8, 2012, each of which applications are incorporated herein in their entirety by this reference thereto.

BACKGROUND OF THE INVENTION

Technical Field

The invention relates to mobile devices. More particularly, the invention relates to a data assistance application for mobile devices.

Description of the Background Art

Mobile devices have become ubiquitous and indispensable in today's world. However, user interaction with such devices is often less than seamless.

Current approaches to entering data into mobile devices include the user touching, typing, or speaking the data. Touching or typing the data requires the user to keep their eyes and hands on the screen, which may be inconvenient in certain situations, such as driving or walking. Speaking the data can be insecure because others may hear what is spoken, and it can be error prone due to speech recognition limitations, especially in noisy environments.

When data is entered during a call, it is usually not retained beyond that call. If the user calls again with the same or a similar intent, the same data must usually be re-entered. Some sophisticated mobile applications may retain entered data beyond a single interaction, but that data is typically only available to the company that asked for the data. If the user engages with another company with a similar intent, the same data usually must be re-entered.

Consider the following transcripts of actual user feedback that was collected in connection with various day-to-day applications of such devices:

I frequently take the same flights, sometimes 2x/month. It would be nice if I could edit existing trips and just update the dates. Instead I have to recreate new trips and be sure to delete my existing trip or else when adding flights I may add to an older trip! The only way around this is to name my trips uniquely even tho its the same trip but a different instance.

If you could somehow send me airport check-in counter numbers, departure & arrival gate numbers & also baggage carousel numbers it would be great. In this age of information I like to be on top of things.

Here is why I don't like it. 1. Trips are not segmented. 2. Trips are not stored on my phone off line. (They might but not in the time frame I expected them to) 3. I have to give them the trip ID so they can add it. 4. It is not free. Every time you try and use a function, it is an up sell.

User info such as name, address, phone number are not saved. I had to type the same info over an over for next reservations.

To check flight status, you need to enter both cities and flight number—not user friendly Clearly, a lot remains to be done to realize the full potential of mobile devices.

SUMMARY OF THE INVENTION

An embodiment of the invention provides a data assist application that allows people to share structured data, and update and/or collaborate in real time. Companies can use embodiments of the invention to send and/or receive structured data. Embodiments of the data assist application work standalone or while the user is talking to a person or a company. In use, information is spread when people share data with non-users. The data are preferably owned and/or controlled by the user and stored on user devices. Further embodiments of the invention integrate with OS-supplied data and third party apps.

BRIEF DESCRIPTION OF THE DRAWINGS

FIGS. 7-11 are flow diagrams that show various processes for executing and managing the sharing of discrete data items between people and enterprises according to the invention, in which:

FIG. 7 shows a process for data sharing during a voice call;

FIG. 8 shows a process for data sharing independent of a voice call;

FIG. 9 shows a process for determination of a party to share with;

FIG. 10 shows a process for transmitting a first data item to the other party; and FIG. 11 shows a process for identifying a discrete data item to share.

DETAILED DESCRIPTION OF THE INVENTION

Figure 1:
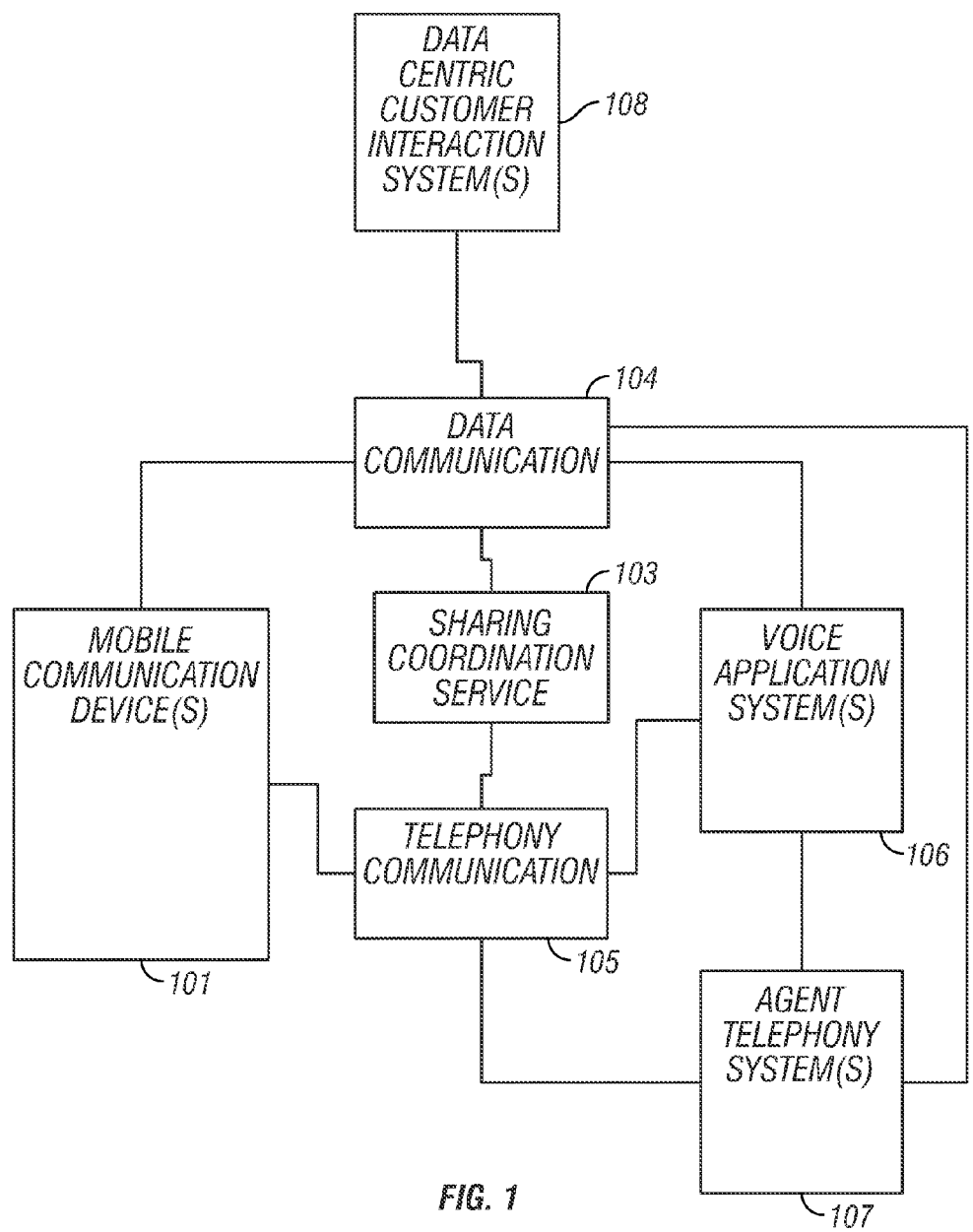
FIG. 1 is a block schematic diagram that shows the individual elements of a system which facilitates a novel form of interaction between a consumer and an enterprise system according to the invention.

An embodiment of the invention provides a data assist application that allows people to share structured data, and update and/or collaborate in real time.

Structured data, as used in this document, consists of information organized and represented consistent with the following qualities:
1. Structured data contains one or more unstructured data items, for example numbers, alphanumeric strings, visual images, recorded audio, and/or encryption keys.
2. Each unstructured data item has a known meaning. Examples of meanings include latitude, associated with a raw number; first name, associated with an alphanumeric string; frequent flyer number, associated with an alphanumeric string; and avatar, associated with an image.
3. Structured data may be categorized as being associated with a type, but this is optional. A given type may guarantee that certain specific patterns of unstructured data items are present, or that some may be optionally present. For example, a geolocation type may require that latitude and longitude values be present. In this case, the latitude and longitude values could be represented as unstructured raw numeric strings.
4. A system that uses structured data may allow for the storage of metadata used consistently for all structured data, such as content owner, creation time, and update time; which users are allowed to view all or parts of the structure data; which users are allowed to change all or parts of the structured data; which users should receive updates when there are changes to all or parts of the data; and which entity originated the data, such as when a business emits data that is owned by a customer.
5. Structured data may be organized such that individual structured data instances can contain one or more other structured data instances. For example, if the system allows for a geolocation type of structured data, an event type can contain an event location represented as an instance of a geolocation type, as well as other data, such as time of event and/or duration.

Companies can use embodiments of the invention to send and/or receive structured data. Embodiments of the data assist application work standalone or while the user is talking to a person or a company. In use, information is spread when people share data with non-users. The data are preferably owned and/or controlled by the user and stored on user devices. Further embodiments of the invention integrate with OS-supplied data and third party apps. The data assist application vastly improves the user's multi-modal experience when data is stored on the client because, for example, users have control.

Pre-Loading of Information onto Consumer Devices

An embodiment of the invention provides a strategy for mobile device information population, for example as a native mobile app for iOS, Android, and/or any other platforms that allows people to share structured data and collaborate in real time; integrates with the mobile device user's calendar, contacts, photos, GPS location, etc.; demonstrates to users how a company sends and receives structured data; is optimized to work best while talking to a person or a company; is designed for viral and/or social growth to provide a broad base of multimodal-ready devices; and empowers users to control storage and sharing of their data completely across user devices.

Description

An embodiment of the invention provides a data assist application that is usable during a regular voice call, although in other embodiments of the invention the data assist application may be used completely outside of a voice call. In some embodiments, the application can replace or tightly integrate with a regular voice call application, while other embodiments may require that the user manually switch to the application during a call. In still other embodiments, it is possible to send a push notification to trigger the application to launch. In still other embodiments, it is possible to launch the application automatically when both parties in the call support this feature. In still other embodiments, it is possible to launch the application when the remote side of a session requests a specific piece of information, or requests to display a piece of information.

Several communication states are possible in various embodiments of the invention, including for example a voice call between two people, where each person has the application; a voice call between two people, where one person has application and the other person does not; and a voice call from a person to an application-supported IVR.

An embodiment of the data assist application manages local storage of information on the user's wireless device. This allows direct storage of discrete pieces of information, such as phone numbers and addresses. The local storage can represent externally stored information, such as GPS-derived location, clipboard content, camera, pictures, notes, and third party apps. Such local control also manages access permissions for specific remote parties, e.g. IVR apps or phone-based contacts. Such information may be structured by and/or associated with a specific remote party, such as a flight itinerary from a particular airline, a confirmation code, and/or an account number. Thus, the user can manage permissions for exchanging pieces of information with remote party, e.g. always allow new itineraries from XYX Airlines and always send when calling. In an embodiment of the invention data types/structure can comprise, for example, URL, phone number, itinerary, latitude and/or longitude, and event. The invention also allows synchronization of locally stored data with server-based storage and/or storage of data related to rendering, such as an airline logo, layout, etc.

Embodiments of the invention include security mechanisms, such as encrypting some items, key management, requiring a password for certain pieces of data, e.g. a PIN.

Embodiments of the invention also include a processing chain mechanism, e.g. receive a flight itinerary from an airline and place the overall flight on the user's calendar, including check-in time. Embodiments include display rendering flexibility, e.g. show nearby store locations on a map, show a friend's location on the map, or show flight options in a table.

Embodiments of the invention also include control of longevity of data that is received from remote party. For example, pushing location data to a friend expires after 15 minutes, while an itinerary from an airline may survive indefinitely.

Embodiments of the invention also include sharing of documents that update and are that are pointed to by a URL, such as SharePoint or drop box.

Embodiments of the invention concern remotely sourced information. Some information can be remotely sourced, such as flight status, friend's location, etc. Remotely sourced information can have expiration rules that are owned by the remote side. After remotely sourced information expires, it is removed from the local side and, if needed, unsubscribed from the remote side. Examples of expiration rules include, the information never expires, the information expires at specific time, the information expires when the remote side decides to expire it, the information expires when the remote user decides to unsubscribe and/or remove the information. The remotely sourced data can be updated, for example, by manual refresh, push notification from the remote side when the data changes, and/or manual push from the remote side. In some cases, remotely sourced data may never be changeable or able to expire.

User Interface During a Call

The remote side can request a piece of data. For example, an IVR can request a mailing address. In response thereto, the UI of the application can display the message "XYZ shoes would like your mailing address <Send Mailing Address>" and, upon activation, the application would send the user's previously stored mailing address.

The user can decide to share some information always ("<Always share my location with GrubHub>").

The user can allow the remote IVR to store data ("Always allow United to store and access confirmation codes, itineraries, loyalty number, etc.").

The user can push specific piece of information. For example, when talking to a friend, the user can send the itinerary of upcoming trip, GPS location, contact information of a mutual friend, bookmarked URL, etc.

The user can request a piece of data ("Where are you?" "What's Mikes' number?").

Voice recognition can be activated during a call to anticipate what to send and/or request. For example, the application can listen for "where are you?" during regular person-to-person conversation and, when detected, prompt the remote side to send the location. An alternate interface could force an explicit UI action, e.g. press the "command" button or say special phrase, before activating voice recognition.

Free-Form SMS/Chat-Like Text Conversations

In this embodiment, the UI shows if other side has the application or not. When there is a voice call between two people, one without the application, one with the application, the application can use SMS to send data and/or links to download the application from an online market, or a URL for the application. The application can also push some data using SMS, provide Web-based access for a subset of functionality, or access from a desktop or a mobile device.

In the situation where the user is without the application but an IVR system supports the application, the IVR system can offer to push a URL to the user to download the application, or the IVR system can offer to push a URL for a Web-based app that supports a subset of the application.

Web Chat Integration

Chat integration is possible directly with the application. The user starts chatting within the application and escalates to a voice call when needed. If data is synced to a server as above, the user should be able to log in using a Web-based chat to supply context data, e.g. send address information, etc. In further embodiments of the invention, additional methods to associate Web access channels include matching an account number, if the Web site allows a login then providing a login in the mobile app, and using a Web-based interface that was already needed in accordance with one of the above modes of communication.

Communication Between Data Assist Application and Third Party Applications

Third-party applications can be a branded application that is owned and/or maintained by a separate entity. The third-party application can expose data that can be used during a call, such as the user's account number; and the third-party application can receive data obtained during the call.

UI Integration-Like Widgets

Embodiments of the invention include usage data aggregation, e.g. how many users call the IVR from the application, etc.; app promotion, e.g. during a call the IVR system pushes a link to a download application from the market; generic third-party applications, e.g. a restaurant operator application can push a menu, accept menu selections, and/or accept a user's address, wherein such application is developed by a third party and usable by any restaurant operator, similar to DropBox SDK usage. The foregoing embodiments would require user confirmation for application integration, access to non-application data, etc. that is similar or identical to IVR access control.

Computer Telephony Integration (CTI)

A CTI-like application shows conversation and/or data exchange details. Information about the person and/or person's applications is usable during agent calls, for example using the same Web-based application that is usable by people. For example, if an agent requests a delivery address, the caller sees that the agent is requesting the caller's address and presses to send an already entered address to the agent concurrently with the agent saying, e.g. "I've requested your address, please press the send address button now."

Other Embodiments

In other embodiments of the invention, if there is a queue a remote IVR system can call back when idle, or otherwise interact with the application, e.g. the application can show the estimated callback time, updated in real time.

Further, the application can be used to optimize actions, such as making a purchase; the application can provide improved ability for outbound notifications, e.g. the application can send flight change notifications with more reliability than SMS, confirm that the user acknowledged seeing the notification, allow user opt-in and/or opt-out, etc.; the application can improve conversation continuity, e.g. after the user's hangs up, the user can see history of what data was exchanged.

Embodiments of the invention can also be used for multi-party negotiation, e.g. Alice asks Bob for Chris's phone number which is in Bob's contact list; the system knows that Chris's phone number in Bob's contact list belongs to Chris, so when Bob attempts to send it to Alice, the system asks Chris for approval before sending.

Use of VOIP to Replace Voice Channel Entirely

Embodiments of the invention can be used for integration with desktop IM.

Other embodiments of the invention relate to call-back usage. For example, if it is desired to give customers the ability to talk to an agent on demand without queues or the use of an IVR system, then the user can push a "Talk to agent" button and an agent would then call the customer when they agent is free to do so. The agent initiates the one and only call. A similar mechanism is applied to coordinate talks between two busy people, where each could change status between busy and/or free and, when both free, a call is triggered.

Further embodiments of the invention concern crawl contacts that keep track of who has the application and who does not, where incentives could be provided to users of the application for getting other people to adopt it.

Data Structure Examples by Vertical

The following discussion provides examples of the data structures that may be used in a presently preferred embodiment of the invention for various market segments.

Retail/Tech

These data structures can include, for example, product identification, e.g. scan by bar/QR code; nearby store locations, e.g. that have certain product in stock; alert on product availability; purchasing data; order ID for order status; shipping address for order; RMA number; demographic data for product troubleshooting; gift card ID; and issue tracking, e.g. issue ID, status, disposition, activity.

Financial

These data structures can include, for example, card data and new policy payment data; payment due dates; account data for statement information; current interest rate data and insurance policy number; rewards program ID; rewards program balance; and credit check data.

Travel/Entertainment

These data structures can include, for example, rewards program ID; rewards program balance; itinerary; confirmation code; flight status; car rental date and/or time; hotel date/time and check-in and/or check-out times; and roadside service data, e.g. location and rental confirmation code.

Communication

These data structures can include, for example, minutes usage; credit check data; payment data, which may include payment for the application on the phone when the phone is sold, or which may include the application without extra charges; bill estimation results; phone upgrade via scan UPC/QR code; account ID; and issue tracking, e.g. issue ID, status, disposition, and activity.

Use Cases

The use cases below show sample consumer-enterprise interactions that involve the data assist application. In each case, the user allows the data assist application to function in a highly optimal fashion.

Flight Status
1. (Check #1) Call airline.
2. Navigate to Flight Status IVR menu.
3. Caller speaks the confirmation code.
4. Data Assist App receives entered confirmation code from the airline and stores it.
5. Data Assist App receives flight status, stores it, and displays it onscreen.
6. IVR speaks flight status, noting it is also onscreen, and the status data is sent to the Data Assist App.
7. Caller hangs up.
8. (Check #2) Caller opens Data Assist App. The flight status is visible. Because of integration between the Data Assist App, the IVR, and the airline Web services, the Flight Status is up to date already. Because the flight status was recently accessed, it is displayed by default in the Data Assist App.
9. (Check #3) Caller Opens the Data Assist App. The latest flight status is visible.
10. Later, the flight occurs and time elapses. Somewhere, a server pushes an expiration message to the Data Assist App, causing the flight status information to be removed because it is obsolete.

Flight Reservation & Modification
1. Caller calls IVR flight reservation numbers.
2 IVR and Data Assist App present coordinated interface for selecting specific itinerary to purchase. During the process, they use the GPS-determined location of caller, in addition to home address data and prior reservation history, to propose airports.
3. Caller selects a specific itinerary to purchase.
4. Caller is transferred to agent.
5. Agent is presented with a Web UI that causes them to be aware that caller is using Data Assist App and already has stored credit card purchase data. Agent uses UI to request card data. This causes the Data Assist App to be aware that the remote side wants to receive card data and displays a large UI element with the text "Send Card Data."
6 Agent asks the caller if they would like to use the on-file credit card, to press "Send Card Data."
7. Caller presses "Send Card Data" to send, and some form of authentication and/or confirmation occurs in the Data Assist App.
8 Agent uses Web UI to determine caller has not entered a rewards number and asks the caller for it.
9. Caller takes rewards number out of their wallet and reads reward number, while agent types it in for reservation, and uses Web UI to push it to the caller's Data Assist App. Ideally, the agent is using software that already integrates with the Data Assist Web UI and this is an automatic step.
10. Caller receives rewards number on Data Assist App, and sees that it had been typed in incorrectly. Caller communicates to Agent that it is wrong, makes a correction in the UI of the Data Assist App, and sends it to agent. Also, the rewards number is permanently stored on Data Assist App.
11. Agent receives corrected rewards number and uses it.
12. Agent processes the credit card transaction and purchases the flight.
13. Agent uses Web UI to determine that caller already has an email address on file and uses Web UI to request it.
14. Agent asks caller to send email address if they would like an emailed receipt.
15. Caller presses "Send Email Address" to send email address.
16. Agent causes full confirmed itinerary to be pushed to Data Assist App and informs caller of this, along with confirmation code and any other needed details.
17. Data Assist App receives the itinerary, and stores it. Additionally, because the itinerary includes events in time, and locations, it communicates with the Calendar app of the mobile device to create calendar events for all flights, including check-in time, and links to check in and for flight status, as well as links to bring up the respective airports on a map for easy driving direction.
18. Caller hangs up.
19. Later, caller desires to change the flight.
20. Caller views purchased itinerary in Data Assist App.
21 Caller presses "Call about this itinerary" button.
22. Data Assist App causes phone to dial airline, while communicating to IVR details concerning the itinerary for which the airline is being called.
23. IVR answers, greets caller by name, and asks them what they want to change about this itinerary.
24. Caller indicates they want to change the departure date.
25. Caller chooses a new date and/or time using integrated voice and/or app experience, possibly including the OS calendar integration to choose free time.
26. IVR informs caller the change requires additional payment and transfers caller to agent.
27. Agent uses Web UI to request credit card as above.
28. Caller sends credit card data.
29. Agent purchases change.
30. The updated itinerary is pushed to the Data Assist App, which also communicates with the calendar app to change the calendar event details.
31. Caller hangs up.

Temporary Location Sharing
1 Caller Alice makes a voice call to Bob using regular phone dialing techniques.
2 Alice and Bob decide they want to meet up at the same physical location. They are walking toward each other.

3. Alice uses the Data Assist App to initiate mutual location sharing for an hour, by clicking the "Share Location" button, then choosing "With Bob" button, because the Data Assist App knows that she is talking towards Bob who has this app, and clicks the "mutual" check box, and the "for an hour" option.
4. Bob sees a notification that Alice wants to share locations mutually for an hour, and clicks the "Accept" button.

Group Travel Planning and Sharing
1. Caller Alice is organizing a trip to Vegas with friends to celebrate her husband John's birthday. She uses the application to call the airline, construct a proposed itinerary, and save it to her data storage under "2012 Vegas Trip."
2. Alice uses app to create a group by selecting them from her phone's contacts and naming the list "Vegas Folks" and making it a shared list, meaning that all members of the list get notified they are on the list and can freely use it (but not change it).
3. Alice shares her "John's Birthday" calendar item and the "2012 Vegas Trip" itinerary with "Vegas Folks" and asks for their comments.
4. Bob, a member of "Vegas Folks", comments that he'd like to arrive a day later and stay an extra day. Discussion ensues over IM and calls.
5. Alice launches a new airline interaction by returning to "2012 Vegas Trip" and, clicking on Modify, launches a multimodal interaction continues to select different flights. All members of the group get notified of the updated itinerary.
6. Everyone agrees. Alice books a restaurant reservation and shares that to the group, as well as a calendar item, and tells everyone to purchase.
7. Each member of the team click's on "Purchase" next to "2012 Vegas Trip" and gets the current fare. They share name, birthdate, and credit card information with the airline, type in the CCV of the and book the itinerary for themselves.

Detailed Discussion of a Presently Preferred Embodiment

FIG. 1 is a block schematic diagram that shows the individual elements of a system which facilitates a novel form of interaction between a consumer and an enterprise system according to the invention. In FIG. 1, a device 101 represents mobile communication devices, such as smartphones, which are capable of initiating, sending, and receiving phone calls, as well as other forms of data. Both of these acts occur by a chosen method of transmission, such as radio signal broadcast from the device to a tower or station. Once the data has been transmitted to the intermediary, it is then ready to be communicated either by telephony or data communication means.

The data communication interface 104 represents a facility that communicates data, such as the Internet or a local intranet. This provides the facility for moving data that was transmitted by the mobile communication device to its destination: either a sharing coordination service or enterprise-based agent telephony systems.

The telephony communication interface 105 represents a facility for communicating voice signal, such as PSTN, LTE, GSM, or CDMA. This provides the facility for moving voice signals that were transmitted by the mobile communication device to its destination, such as a sharing coordination device, a voice application system, or an enterprise-based agent telephony system. The voice signal may also be communicated over interface 104 by VOIP or similar technologies.

The sharing coordination service 103 represents a service that is accessible by both telephony and data communication facilities, though the telephony communication is strictly optional. In embodiments of the invention, the sharing coordination service can be any of a centralized system and a decentralized, peer-to-peer system.

The data communication facilities communicate with this service to send and receive structured data, while the telephony communication facilities are used to transmit data, such using SMS or outbound calls. This service also provides a centralized point for determining user account and subscription data, as well as a registry for the different forms of structured data that might be transmitted.

The voice application systems 106 represent an enterprise-based voice application system that accepts inbound calls and performs automated routines and services based on the nature of the call. These systems typically involve a front end which allows calls to be processed and a backend which is used to store and retrieve data pertinent to the enterprise. Optionally, aggregated data can then be retransmitted to an agent telephony system by the data communications interface 104 and the telephony communications interface 105.

The agent telephony systems 107 represents an enterprise-based agent telephony system which comprises live agents who handle incoming and outgoing calls, supplemented by structured data provided by a sharing coordination service 103. The system can then transmit data by using the data communications interface 104 and the telephony communications interface 105.

The data-centric customer interaction system 108 represents a data-centric customer interaction system which communicates by the data communications facility 104. Each of these services comprises hosted application environments and a facility for communicating data externally. Each of the hosted application environments comprises service and customer interface applications, which provide facilities for both programmatically and manually updating, retrieving, and publishing customer data. Also included in the hosted application environments are a persistent storage system and an interface for accessing it, which provides functionality to the customer and service interfaces in a domain-specific manner. The external data communication facilities provide an interface for transmitting data to and from the hosted application environment via the data communications facility 104.

Figure 2:
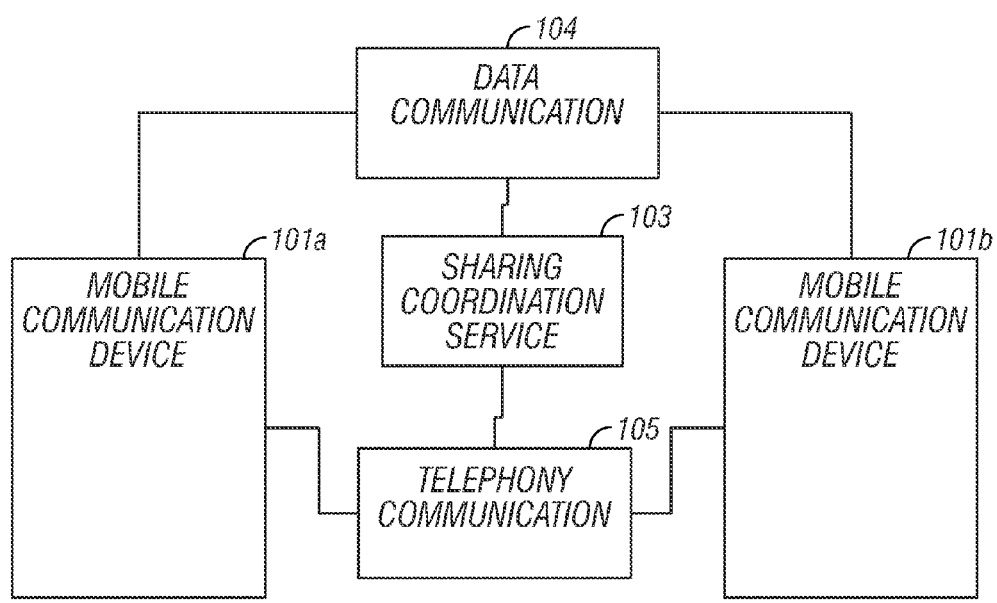
FIG. 2 is a block schematic diagram that shows elements of a system that facilitates sharing of structured data between two individual operators of mobile communication devices according to the invention.

FIG. 2 is a block schematic diagram that shows elements of a system that facilitates sharing of structured data between two individual operators of mobile communication devices 101a and 101b according to the invention. The operators communicate with the sharing coordination service 103 using data communication facility 104 to negotiate and share structured data.

Figure 3:
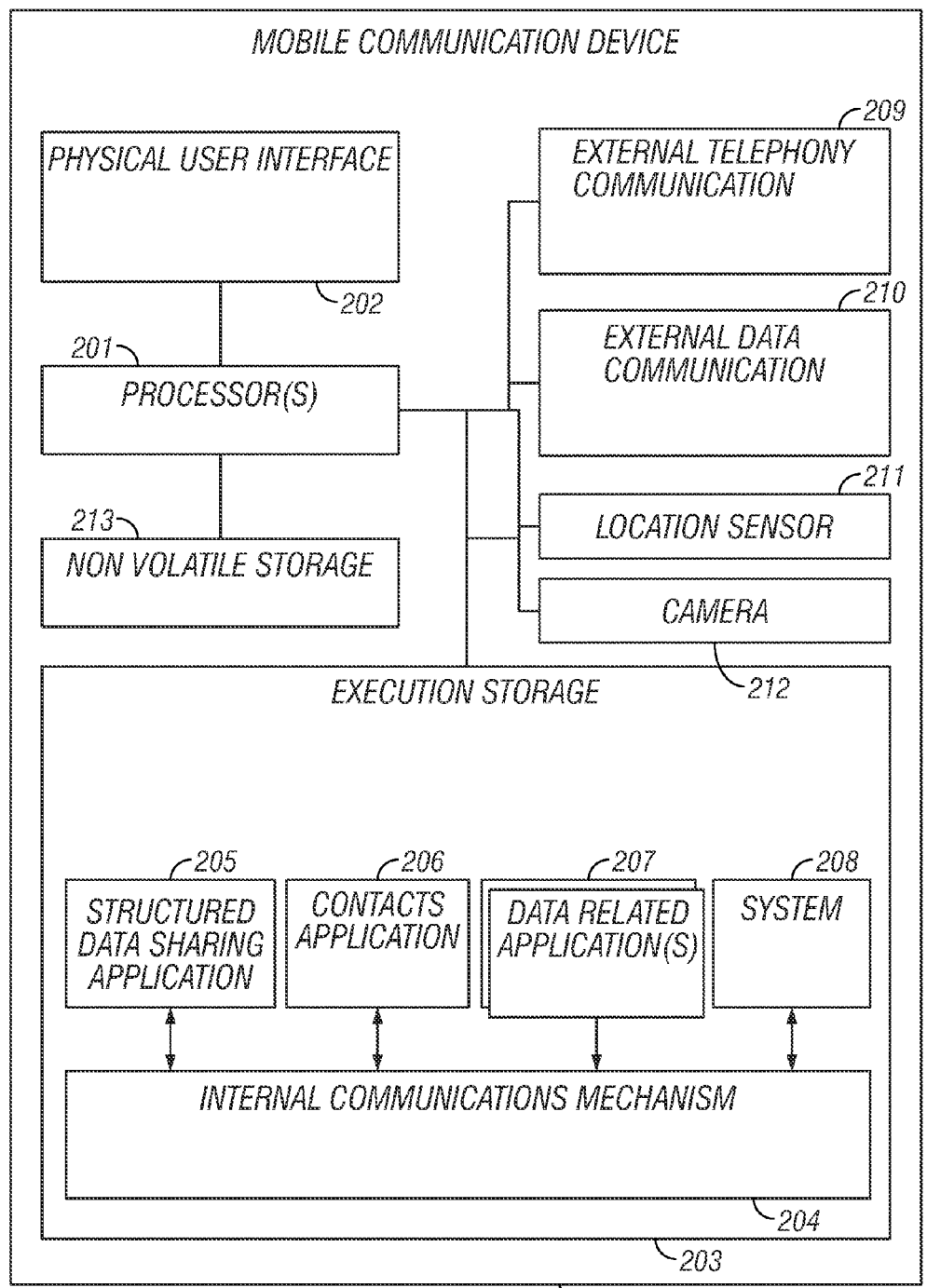
FIG. 3 is a block schematic diagram that shows detailed elements of an individual mobile communication device that has been modified to support novel structured data sharing techniques according to the invention.

FIG. 3 is a block schematic diagram that shows detailed elements of an individual mobile communication device 101 that has been modified to support novel structured data sharing techniques according to the invention. The device includes one or more processors 201, an execution storage area 203 such as flash memory, onboard storage 213 such as a database backed by flash memory, and a user interface 202 which may include several components such as a display, microphone, or speaker. The external data communication facility 210 allows the transmission and receipt of digital data, such as by cellular radio, digital radio, or wired networked access. The external telephony communication facility 209 allows transmission and receipt of voice communications such as by cellular signal or PSTN, and may be encoded as with VOIP to use the data communication means 210.

The structured data sharing application 205 uses onboard storage 213 to store structured data that is accessible to the device user. The stored structure data may have been obtained from a variety of locations, including having been transmitted from other users using the external data communication facility 210. Additionally, the structured data sharing application can use the internal communications mechanism 204 to obtain structured data from, and transmit structured data to, other data related applications 207, the system 208, and optionally a contact management application 206. Additionally, the data sharing application may obtain data from onboard devices, such as the location sensor 211, which may be a GPS receiver and the onboard camera 212, and transform this received data to a uniform structured data representation. The structured data may be exposed through the user interface as discrete sharable data items that can be shared with other users in a managed way, stored locally, or otherwise acted upon in a uniform manner.

Figure 4:
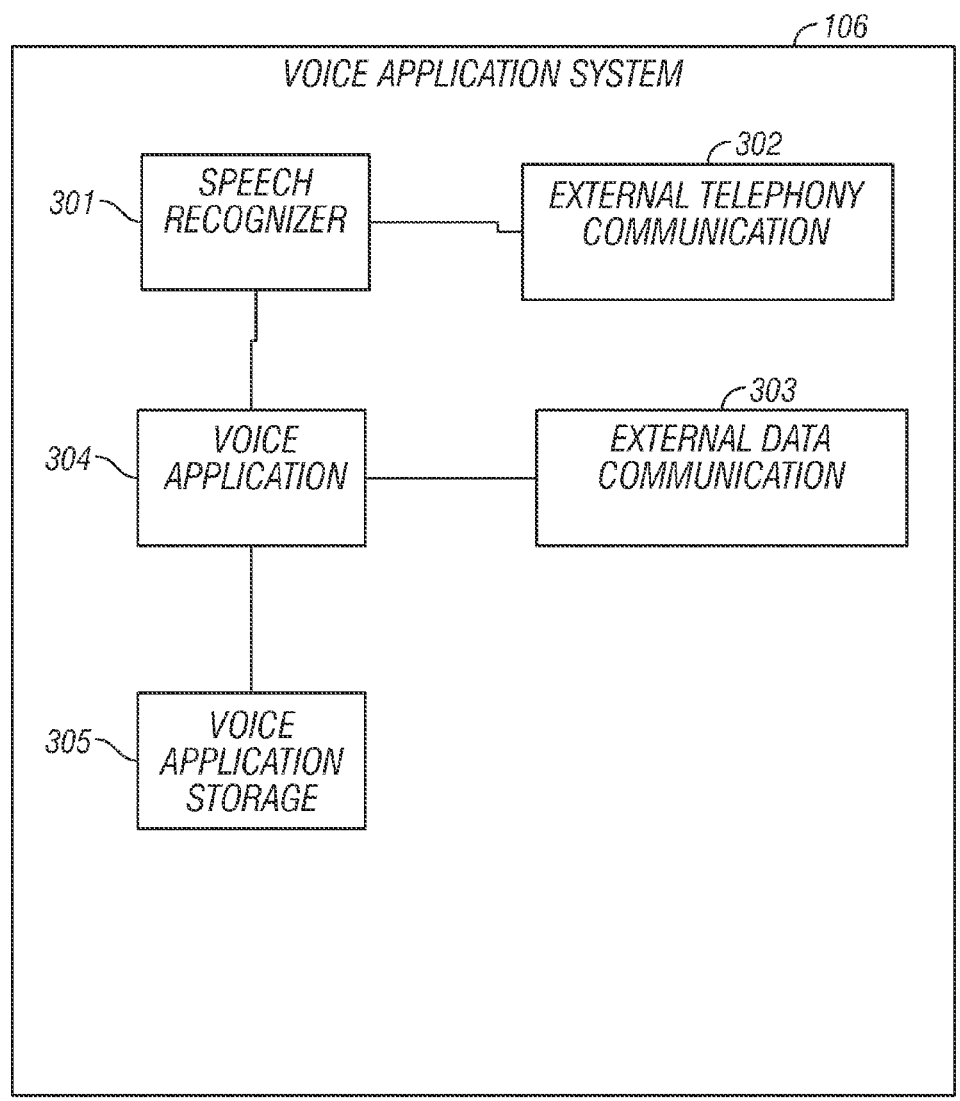
FIG. 4 is a block schematic diagram that shows a voice application system that may automatically receive, initiate, and process voice calls using speech recognition, text-to-speech, and audio processing technology according to the invention.

FIG. 4 is a block schematic diagram that shows a voice application system that may automatically receive, initiate, and process voice calls using speech recognition, text-to-speech, and audio processing technology according to the invention. The system can be configured to communicate with the sharing coordination service 103 using the external data communication facility 303.

Figure 5:
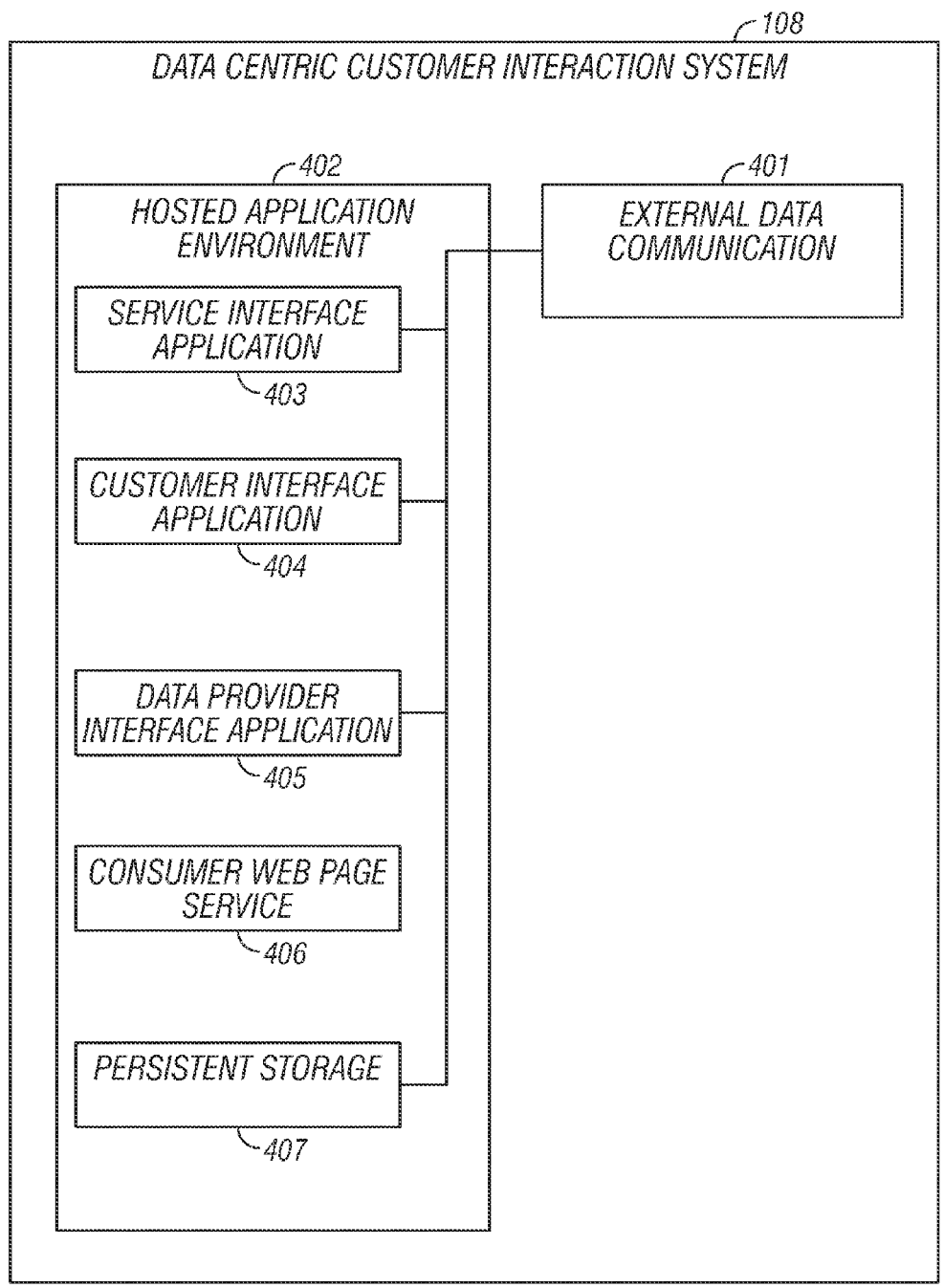
FIG. 5 is a block schematic diagram that shows a customer interaction system that can communicate with customers directly using the external communication facility, such as through a Web page, as well as with external software applications that perform automated data exchange functions according to the invention.

FIG. 5 is a block schematic diagram that shows a customer interaction system that can communicate with customers directly using the external communication facility 401, such as through a Web page, as well as with external software applications that perform automated data exchange functions according to the invention.

Figure 6:
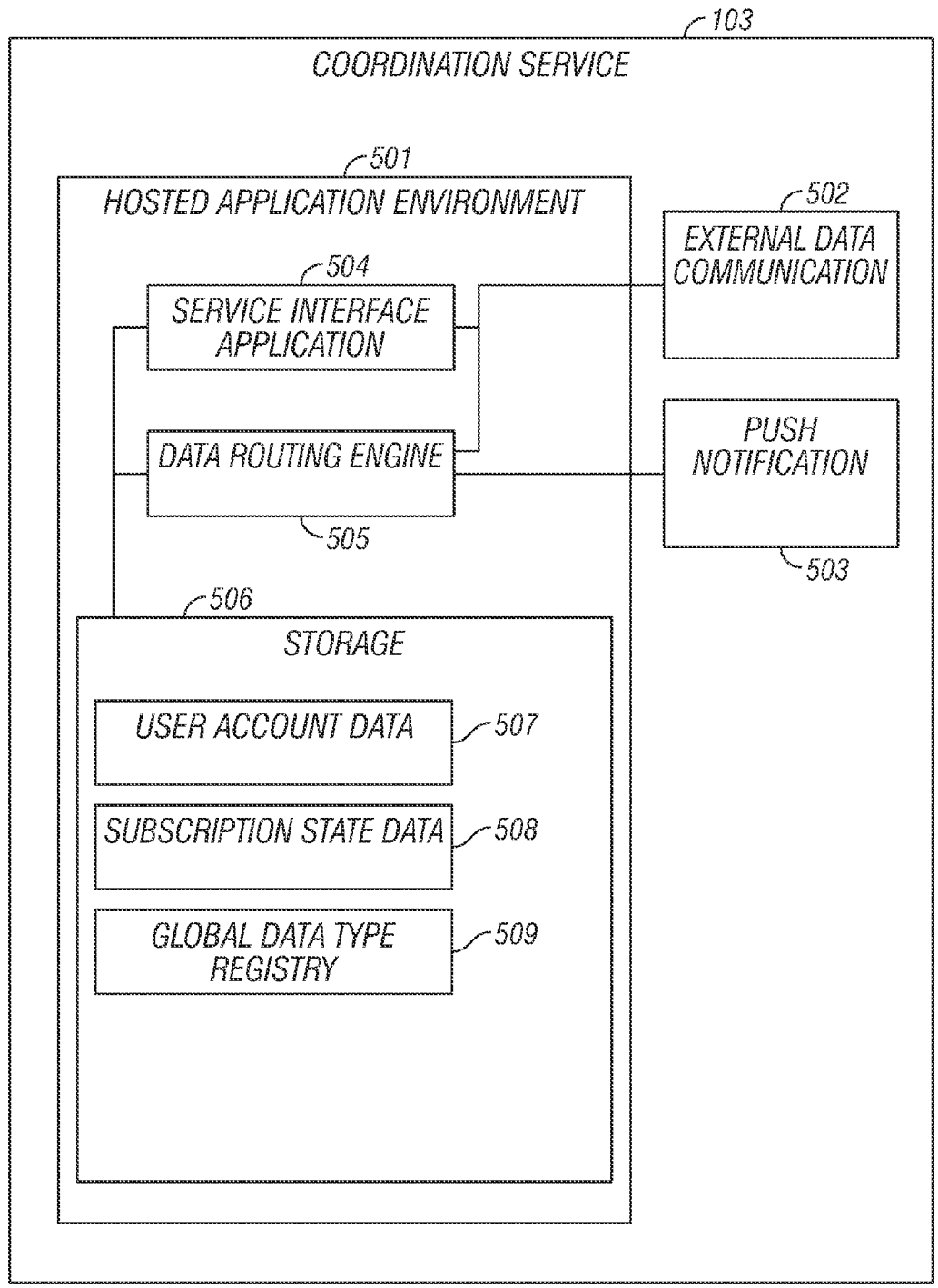
FIG. 6 is a block schematic diagram that shows a data coordination service according to the invention.

FIG. 6 is a block schematic diagram that shows a data coordination service according to the invention. The service coordinates the sharing of discrete structured data items between people using mobile communication devices and one or more enterprises. The system allows structured data items to be shared between people, between people and enterprises, and between enterprises.

The service interface application 504 uses the external data communication facility 502, which may be the Internet, to communicate with mobile communication devices, data-centric customer interaction systems, voice application systems, and other compatible potential producers and consumers of structured data. The service interface application uses storage 506 to manage user registration data 507, thus allowing external entities to register and manage user accounts. The service interface application also manages a data type registry 509 which allows the registration and management of globally unique data structure types that can be used across different devices and applications. For example, a registered type may specify how to store data to refer to a geographical point on earth, which may be used to share both sensed locations of friends, as well as locations of a business.

The data routing engine 505 is made aware of changes to structured data in real time, and manages the association of data consumers to producers, using storage 506. Upon being notified of changes in data, the data routing engine determines which consumers should be made aware of the change, and transmits the change to the respective consumers. The data routing engine may employ a push notification facility 503 to initiate notifications to potential data consumers that new data is available.

FIGS. 7-11 are flow diagrams that show various processes for executing and managing the sharing of discrete data items between people and enterprises according to the invention.

Figure 7:
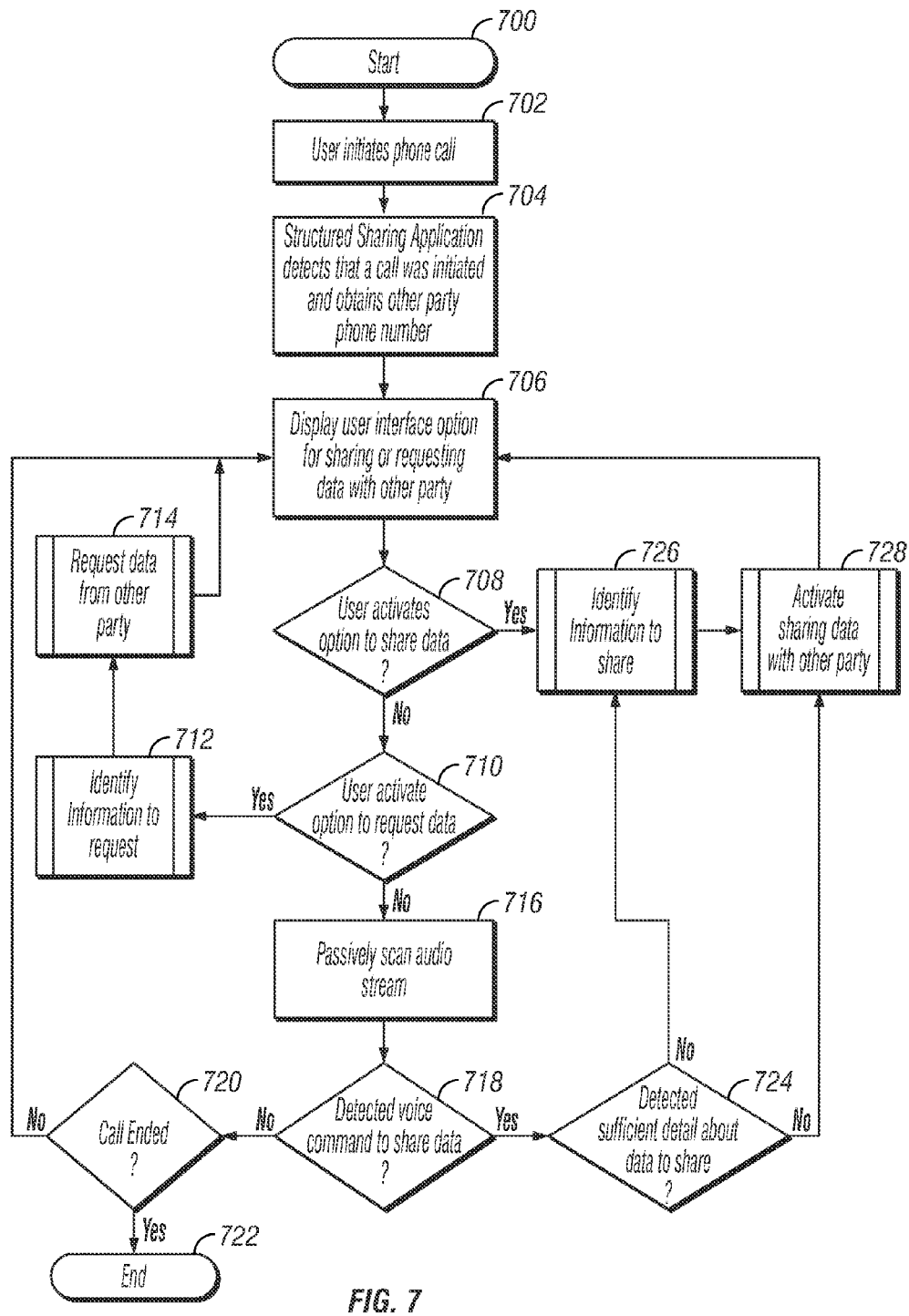

In FIG. 7, a process for data sharing during, in which a voice call is at Start (700), the User initiates a phone call (702). A Structured Sharing Application detects that a call was initiated and obtains the other party's phone number (702). The phone displays the user interface option for sharing or requesting data with another party (704). The system determines if the User activates the option to share data (708).

If Yes, Identify information to share (726), Activate sharing data with the other party (728), and return to Step (706) and continue.

If Step (708) is No, the system determines if the User activates the option to request data (710). If No, the system passively scans the audio stream (716).

Has the system detected a voice command to share data (718)? If No, has the Call Ended (720)? If Yes, End the session (722). If No, return to Step (706) and continue.

If the User activates the option to request data (710), then identify information to request (712) and request data from the other party (714), return to Step (706), and continue.

Has the system detected a voice command to share data (718)? If yes, has the system detected sufficient detail about data to share (724)? If Yes, activate sharing data with the other party (728), and return to Step (706) and continue.

Has the system detected a voice command to share data (718)? If No, identify information to share (726), activate sharing data with the other party (728), and return to Step (706) and continue.

Figure 8:
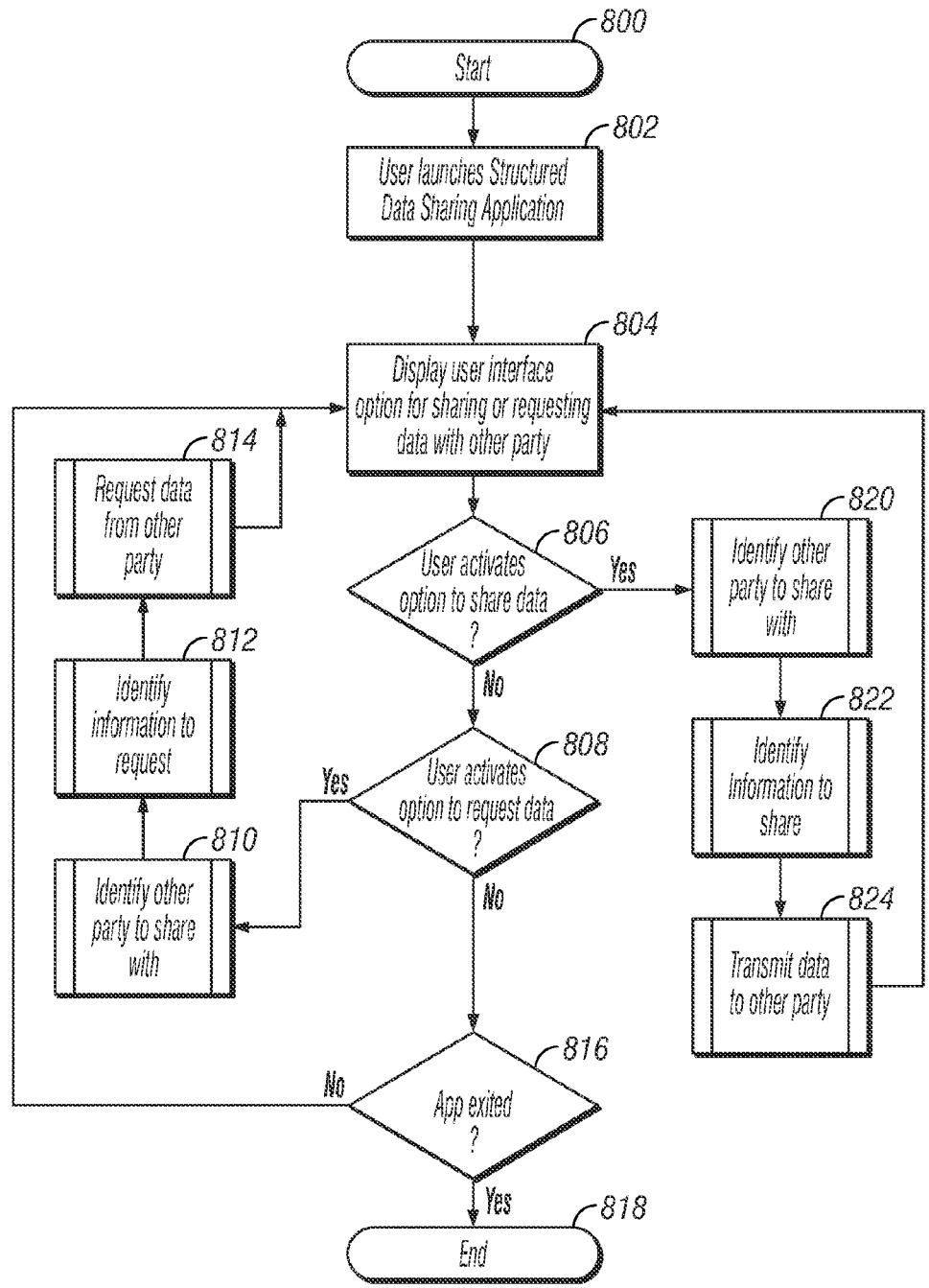

In FIG. 8, a process for data sharing independent of a voice call is at Start (800), the User launches a Structured Sharing Application (802). The phone displays the user interface option for sharing or requesting data with another party (804). The system determines if the User activates the option to share data (806).

If Yes, Identify the other party to share with (820), identify the information to share (822), transmit the data to the other party (824), and return to Step (804) and continue.

If Step (806) is No, the system determines if the User activates the option to request data (808). If No, has the application been exited (816)? If Yes, End the session (818). If No, return to Step (804) and continue.

If the User activates the option to request data (808), then identify the other party to share with (810), identify Information to request (812), request data from the other party (814), return to Step (804), and continue.

Figure 9:
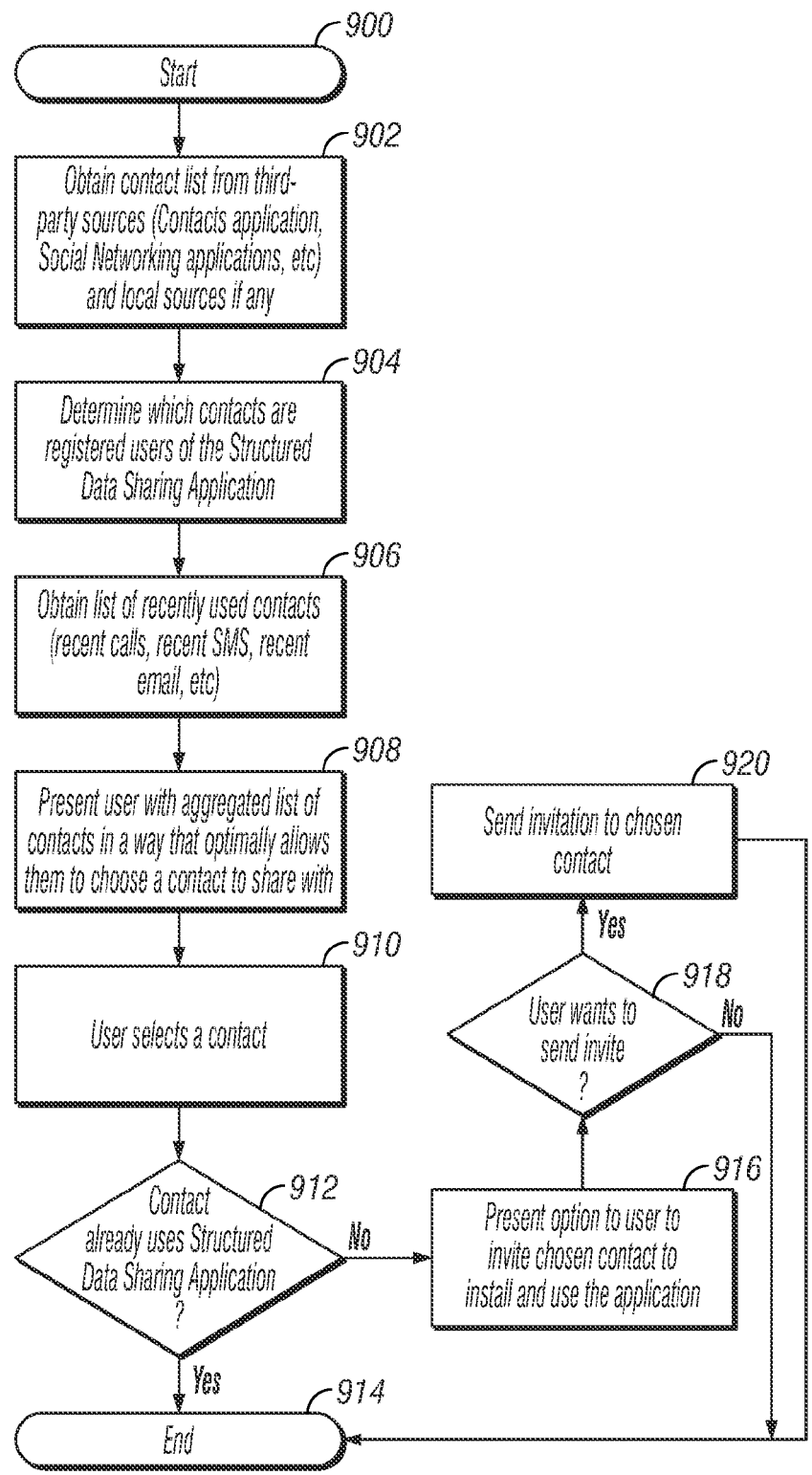

In FIG. 9, a process for determination of a party to share with is at start (900), Obtain a contact list from third party sources, e.g. Contacts application, Social Networking applications, etc., and local sources, if any (902). The system determines which contacts are registered users of the Structured Data Sharing Application (904). The system obtains a list of recently used contacts, e.g. recent calls, recent SMS, recent email, etc. (906). The system presents the user with an aggregated list of contacts in a way that optimally allows them to choose a contact to share with (908).

The user selects a contact (910). If the Contact already uses the Structured Data Sharing Application (912), then the process ends (914). If the Contact does not already use the Structured Data Sharing Application (912), then the User is presented with the option to invite chosen contact to install and use the application (916). If the User wants to send the invitation (918), then the invitation is sent to the chosen contact 920 and the process ends (914); else, the process ends (914).

Figure 10:
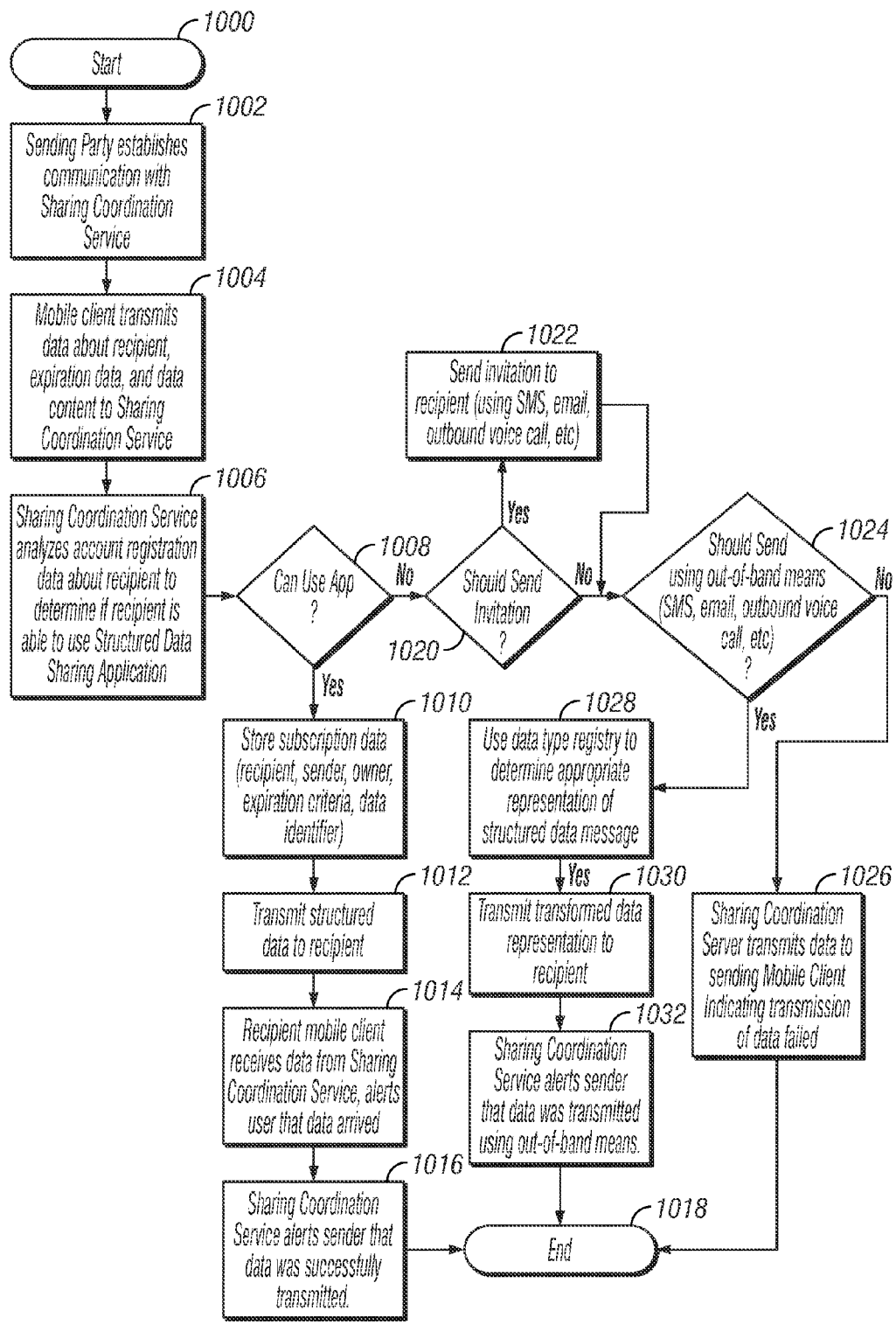

In FIG. 10, a process for transmitting a first data item to the other party is at start (1000), the Sending Party establishes communication with the Sharing Coordination Service (1002). The Mobile client transmits data about the recipient, expiration data, and data content to the Sharing Coordination Service (1004). The Sharing Coordination Service analyzes account registration data about the recipient (1006) to determine if the recipient is able to use the Structured Data Sharing Application (1008).

If Yes, store subscription data, e.g. recipient, sender, owner, expiration criteria, and data identifier (1010) and transmit structured data to the recipient (1012). The Recipient mobile client receives data from the Sharing Coordination Service and alerts the user that the data has arrived (1014), and the Sharing Coordination Service alerts the sender that the data was successfully transmitted (1016), and Ends the session (1018).

If Step (1008) is No, should an invitation be sent (1020)? If Yes, send an invitation to the recipient, e.g. using SMS, email, outbound voice call, etc. (1022). Then, whether or not an invitation is to be sent, at Step (1020) a determination is made if the invitation Should be sent using out-of-band means, e.g. SMS, email, outbound voice call, etc. (1024).

If No, the Sharing Coordination Server transmits data to the sending Mobile Client indicating that transmission of data has failed (1026); else, should the system use a data type registry to determine an appropriate representation of the structured data message (1028)? If Yes, then transmit the transformed data representation to the recipient (1030), the Sharing Coordination Service alerts the sender that the data was transmitted using out-of-band means (1032), and ends the session (1018).

Figure 11:
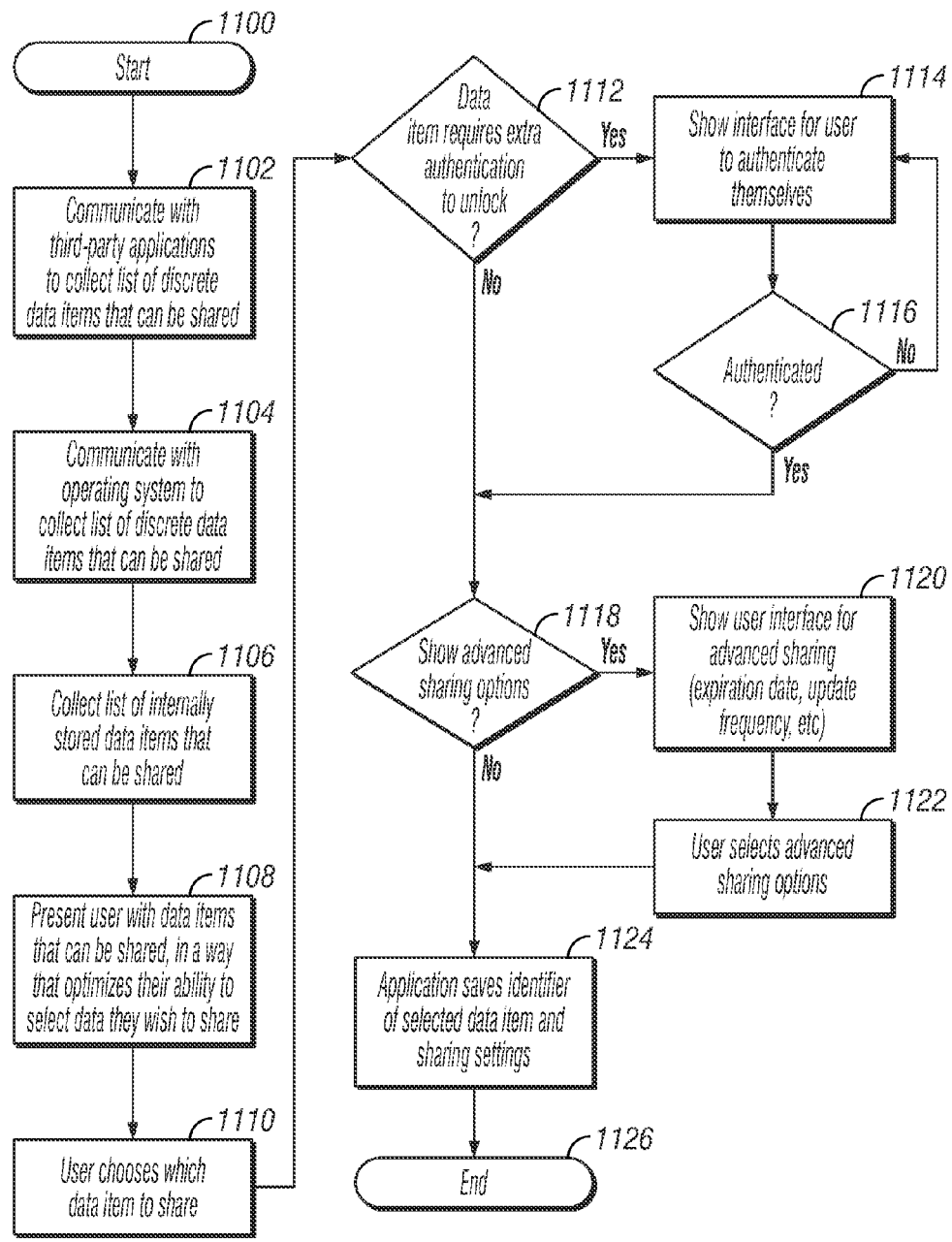

In FIG. 11, a process for identifying a discrete data item to share is at start (1100). The system communicates with third-party applications to collect a list of discrete data items that can be shared (1102); communicates with the operating system to collect a list of discrete data items that can be shared (1104); collects a list of internally stored data items that can be shared (1106); and presents the user with data items that can be shared in a way that optimizes the users' ability to select data they wish to share (1108). The User chooses which data item to share (1110).

If a Data item requires extra authentication to unlock (1122), the system shows an interface with which the user may be authenticated (1114). If the user is not authenticated (1116), then this interface continues to be shown; else, or if the Data item does not require extra authentication to unlock, the system determines if it should show advanced sharing options (1118).

If Yes, the system Shows the user interface for advanced sharing, e.g. expiration date, update frequency, etc. (1120) and the User selects advanced sharing options (1122); then, or if the system determines it should not show advanced sharing options, the Application saves an identifier of a selected data item and the sharing settings (1124) and the process Ends (1126).

Computer Implementation

Figure 12:
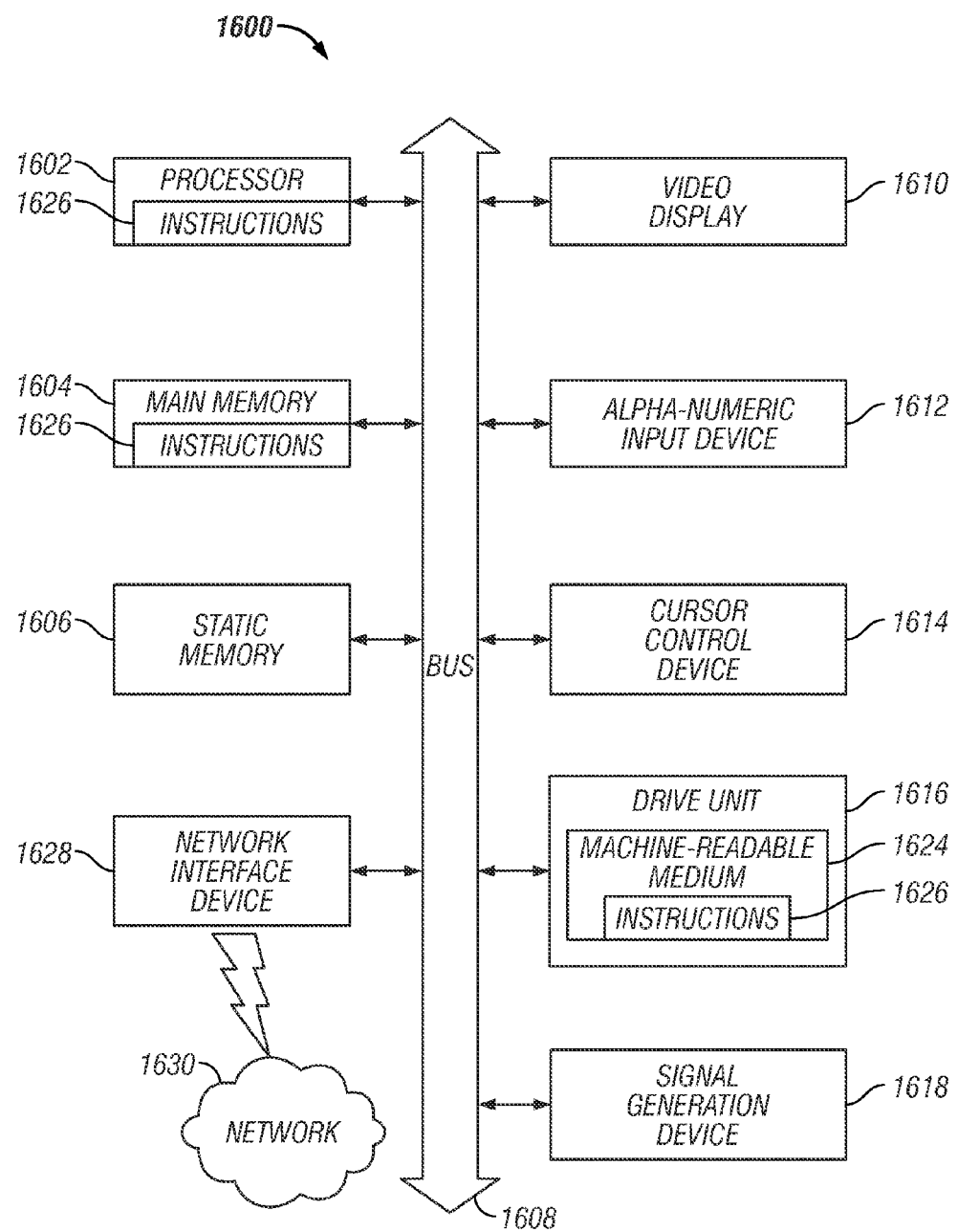
FIG. 12 is a block schematic diagram that depicts a machine in the exemplary form of a computer system within which a set of instructions for causing the machine to perform any of the herein disclosed methodologies may be executed.

FIG. 12 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system for sharing structured data and collaborating in real time via one or more mobile communication devices that are configured for initiating, sending, and receiving any of phone calls and other forms of data by a chosen method of transmission, said system comprising:

a data communication interface for communicating data to a facility for moving data that was transmitted by said mobile communication device to its destination via any of a sharing coordination service or enterprise-based agent telephony system;

a sharing coordination service that is accessible by any of a telephony interface and said data communication interface, wherein said data communication interface communicates with said sharing coordination service to send and receive structured data, said sharing coordination service determining user account and subscription data, as well as a registry for different forms of structured data that might be transmitted; and a structured data sharing application for storing structured data that is accessible to a user of said mobile communication device:

wherein said stored structure data is obtained from a plurality of sources, including an external data communication facility comprising web services;

said structured data sharing application is configured to obtain structured data from, and transmit structured data to, another data sharing application during a voice call;

wherein said structured data sharing application also obtains data from one or more devices that are onboard said mobile communication device;

said structured data sharing application transforming said received data to a uniform structured data representation;

wherein said structured data is exposed to a user through a user interface as discrete sharable data items that can be shared with other users in a managed way, stored locally, or otherwise acted upon in a uniform manner;

wherein the structured data sharing application is automatically invoked during the voice call when the sharing coordination service determines that another party to the voice call has requested a discrete structured data item and that both parties in the voice call support structured data sharing; and wherein, when automatically invoked, the structured data sharing application causes display, via a screen of the mobile communication device, of a user interface option to share the requested discrete structured data item with the other party.

2. The system of claim 1, said sharing coordination service comprising any of a centralized system and a decentralized, peer-to-peer system.

3. The system of claim 1, further comprising:
a data-centric user interaction system for communicating by said data communications interface with one or more hosted application environments comprising service and user interface applications, which provide facilities for both programmatically and manually updating, retrieving, and publishing user data.

4. The system of claim 1, further comprising:
a telephony communication interface for communicating voice signals to a facility for moving voice signals that were transmitted by said mobile communication device to its destination via any of said sharing coordination service, a voice application system, or an enterprise-based agent telephony system; and a voice application system for accepting inbound calls and for performing automated routines and services based on the nature of a call.

5. The system of claim 1, further comprising:
an agent telephony system comprising live agents who handle incoming and outgoing calls, supplemented by structured data provided by said sharing coordination service.

6. The system of claim 1, wherein said sharing coordination service facilities communication among disparate mobile communication devices using a data communication facility to negotiate and share structured data.

7. The system of claim 1, further comprising:
a voice application system for automatically receiving, initiating, and processing voice calls using any of speech recognition, text-to-speech, and audio processing technology, said voice application system communicating with said sharing coordination service via an external data communication facility.

8. The system of claim 7, said voice application system passively scanning for specific phrases to facilitate a relevant data transmission.

9. The system of claim 1, further comprising:
a customer interaction system for communicating with users directly using via any of an external communication facility and one or more external software applications for performing automated data exchange functions.

10. The system of claim 1, wherein said data coordination service coordinates sharing of discrete structured data items between one or more mobile communication devices and one or more enterprises, wherein structured data items are shared between users, between users and enterprises, and between enterprises.

11. The system of claim 1, further comprising:
a service interface application for using an external data communication facility to communicate with one or more mobile communication devices, data-centric customer interaction systems, voice application systems, and other producers and consumers of structured data.

12. The system of claim 11, said service interface application, further comprising:
a data type registry for registration and management of globally unique data structure types for use across different devices and applications.

13. The system of claim 1, further comprising:
a data routing engine for tracking changes to structured data in real time, and managing an association of data consumers to producers, said data routing engine determining, when notified of changes in data, which consumers should be made aware of said changes, and transmitting said changes to respective consumers.

14. In a system for sharing structured data and collaborating in real time via one or more mobile communication devices that are configured for initiating, sending, and receiving phone calls, as well as other forms of data by a chosen method of transmission, a mobile communication device comprising:

a data communication interface for communicating data to a facility for moving data that was transmitted by said mobile communication device to its destination via any of a sharing coordination service or enterprise-based agent telephony system;

a structured data sharing application for storing structured data that is accessible to a user of said mobile communication device;

wherein said structured data sharing application also obtains data from one or more devices that are onboard said mobile communication device;

said structured data sharing application transforming said received data to a uniform structured data representation;

wherein said structured data is exposed to a user through a user interface as discrete sharable data items that can be shared with other users in a managed way, stored locally, or otherwise acted upon in a uniform manner;

wherein said stored structured data is obtained from a plurality of sources, including an external data communication facility via a sharing coordination service that is accessible by said data communication interface and any of a telephony interface, wherein said data communication interface communicates with said sharing coordination service determining user account and subscription data, as well as a registry for different forms of structured data that might be transmitted, said external data communication facility comprising web services;

said structured data sharing application using an internal communications mechanism to obtain structured data from, and transmit structured data to, a plurality of other data related applications during a voice call;

wherein the structured data sharing application is automatically invoked during the voice call when said sharing coordination service determines that another party to the voice call has requested a discrete structured data item and that both parties in the voice call support structured data sharing; and wherein, when automatically invoked, the structured data sharing application causes display, via a screen of the mobile communication device, of a user interface option to share the requested discrete structured data item with the other party.

15. The mobile communication device of claim 14, wherein said structured data sharing application is integrated with a voice call application at the mobile communication device, the voice call being initiated via the voice call application.

16. The mobile communication device of claim 14, wherein said device is operable for any of:
 a voice call between two users, where each user's device has a structured data sharing application;
 a voice call between two users, where one user's device has a structured data sharing application and the other user's device does not; and
 a voice call from a user to an IVR that supports a structured data sharing application on said user's device.

17. The mobile communication device of claim 14, further comprising:
 a facility for managing local storage of information on said mobile communication device to allow direct storage of discrete pieces of information, and for managing access permissions for specific remote parties.

18. The mobile communication device of claim 14, wherein said structured data sharing application operates said mobile communication device to communicate with a voice application system for automatically receiving, initiating, and processing voice calls using any of speech recognition, text-to-speech, and audio processing technology, said voice application system communicating with a sharing coordination service via an external data communication facility.

19. The mobile communication device of claim 18, said voice application system passively scanning for specific phrases to facilitate a relevant data transmission.

20. The mobile communication device of claim 14, wherein said structured data sharing application operates said mobile communication device to communicate with a chat application and escalates to a voice call when needed.

21. The mobile communication device of claim 14, wherein said structured data sharing application operates said mobile communication device to communicate in a multi-party negotiation.

22. The mobile communication device of claim 14, wherein said structured data sharing application operates said mobile communication device to communicate as a voice browser that accepts out of band data.

23. The mobile communication device of claim 14, wherein said structured data sharing application operates said mobile communication device to associate out of band user pairs with phone number pairs.

24. A computer implemented method for sharing structured data and collaborating in real time via one or more mobile communication devices that are configured for initiating, sending, and receiving phone calls, as well as other forms of data by a chosen method of transmission, said method comprising:
 providing a data communication interface for communicating data to a facility for moving data that was transmitted by said mobile communication device to its destination via any of a sharing coordination service or enterprise-based agent telephony system;
 providing a telephony communication interface for communicating voice signals to a facility for moving voice signals that were transmitted by said mobile communication device to its destination via any of a sharing coordination service, a voice application system, or an enterprise-based agent telephony system;
 providing a sharing coordination service that is accessible by both said telephony and data communication interfaces, wherein said data communication facility communicates with said sharing coordination service to send and receive structured data, and wherein said telephony communication facility transmits data, said sharing coordination service providing a centralized point for determining user account and subscription data, as well as a registry for different forms of structured data that might be transmitted;
 providing a voice application system for accepting inbound calls and for performing automated routines and services based on the nature of a call;
 providing an agent telephony system comprising live agents who handle incoming and outgoing calls, supplemented by structured data provided by said sharing coordination service;
 providing a data-centric user interaction system for communicating by said data communications facility with one or more hosted application environments comprising service and user interface applications, which provide facilities for both programmatically and manually updating, retrieving, and publishing user data;
 providing on said mobile communication device a structured data sharing application for storing structured data that is accessible to a user of said mobile communication device:
 wherein said stored structured data is obtained from a plurality of sources, including an external data communication facility comprising web services:
 said structured data sharing application using an internal communications mechanism to obtain structured data from, and transmit structured data to, a plurality of other data related applications during a voice call;
 wherein said structured data sharing application also obtains data from devices that are onboard said mobile communication device; and said structured data sharing application transforming said received data to a uniform structured data representation;

wherein said structured data is exposed to a user through a user interface as discrete sharable data items that can be shared with other users in a managed way, stored locally, or otherwise acted upon in a uniform manner;

wherein the structured data sharing application is automatically invoked during the voice call when said sharing coordination service determines that another party to the voice call has requested a discrete structured data item and that both parties in the voice call support structured data sharing; and wherein, when automatically invoked, the structured data sharing application causes display, via a screen of the mobile communication device, of a user interface option to share the requested discrete structured data item with the other party.

* * * * *